US007966231B2

(12) United States Patent  
Foster

(10) Patent No.: US 7,966,231 B2  
(45) Date of Patent: Jun. 21, 2011

(54) SYSTEM AND METHOD FOR CALCULATING TAXES AND MULTI-CURRENCY PRICING

(75) Inventor: Robert A. Foster, Brighton (AU)

(73) Assignee: Financial Systems Technology (Intellectual Property) Pty. Ltd., Malvern, Victoria (AU)

( * ) Notice: Subject to any disclaimer, the term of this patent is extended or adjusted under 35 U.S.C. 154(b) by 982 days.

(21) Appl. No.: 11/519,380

(22) Filed: Sep. 11, 2006

(65) Prior Publication Data

US 2007/0043636 A1 Feb. 22, 2007

(51) Int. Cl.
*G06F 17/22* (2006.01)
(52) U.S. Cl. ........................................................ 705/31
(58) Field of Classification Search .................. None
See application file for complete search history.

(56) References Cited

U.S. PATENT DOCUMENTS

| | | | | |
|---|---|---|---|---|
| 5,943,657 | A | * | 8/1999 | Freestone et al. ............. 705/400 |
| 6,424,706 | B1 | * | 7/2002 | Katz et al. ................ 379/144.01 |
| 6,477,510 | B1 | * | 11/2002 | Johnson .......................... 705/30 |

* cited by examiner

*Primary Examiner* — F. Ryan Zeender  
*Assistant Examiner* — Faris Almatrahi  
(74) *Attorney, Agent, or Firm* — Edward C. Kwok; Haynes and Boone, LLP

(57) ABSTRACT

A method and a system for determining taxes attributable to a financial transaction create a tax rate table, link an entity of the financial transaction to the tax rate table through a product rule, and calculate taxes based on the tax rate table according to one component of the financial transaction. The tax rate tables can be linked by a default product rule, which is a defined by a global variable. Alternatively, specific product rules can be used to link specific entities, such as tax jurisdiction records, or legal entity records. In one application, the method and the system calculate revenue tax, cost tax, input tax, and profits for each transaction. The method and the system may further include multi-currency support analysis for a financial transaction so that a financial transaction can be analyzed under a common currency, even though the financial transaction is conducted using one or more currencies in one or more jurisdictions.

25 Claims, 3 Drawing Sheets

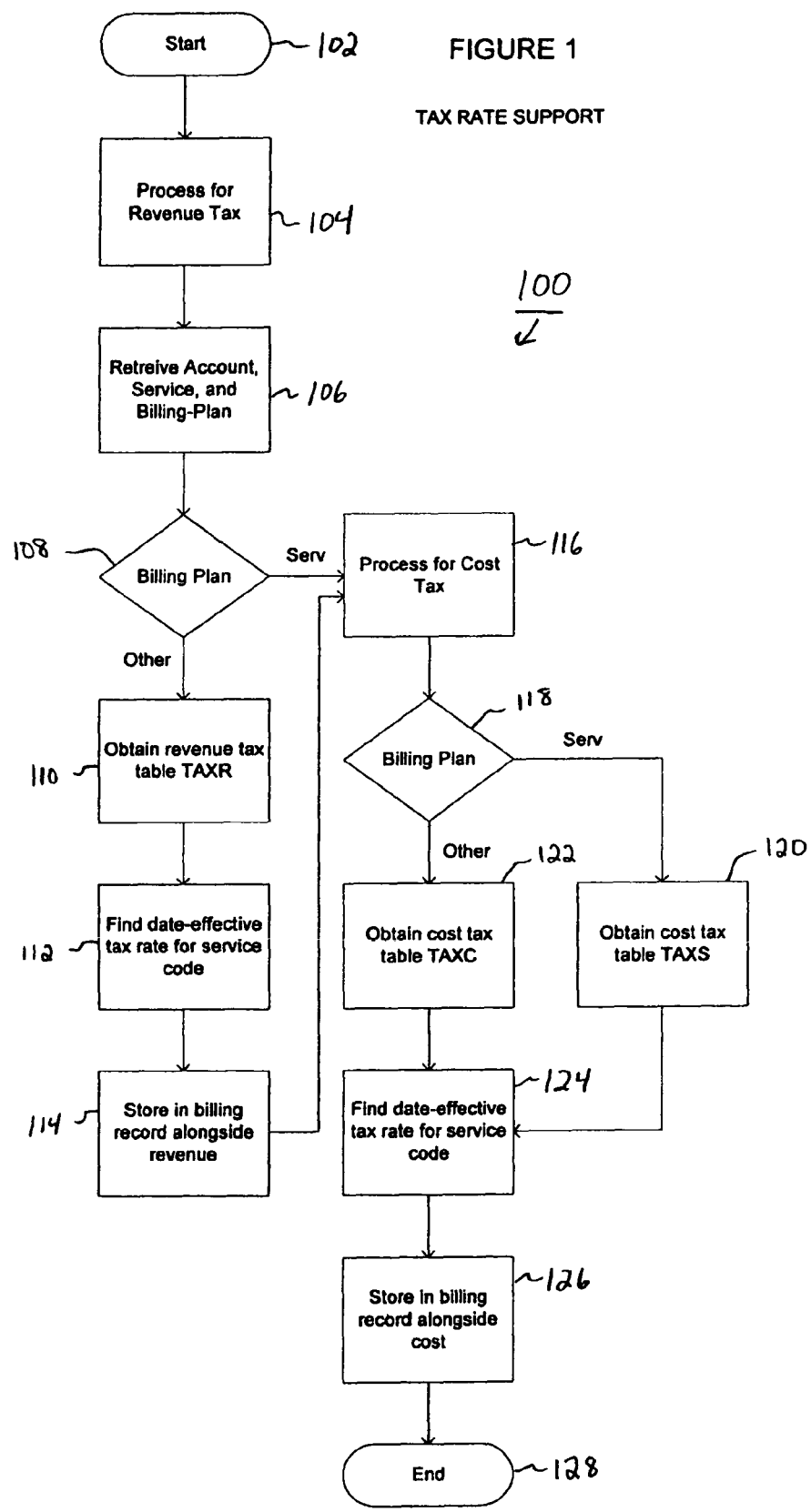

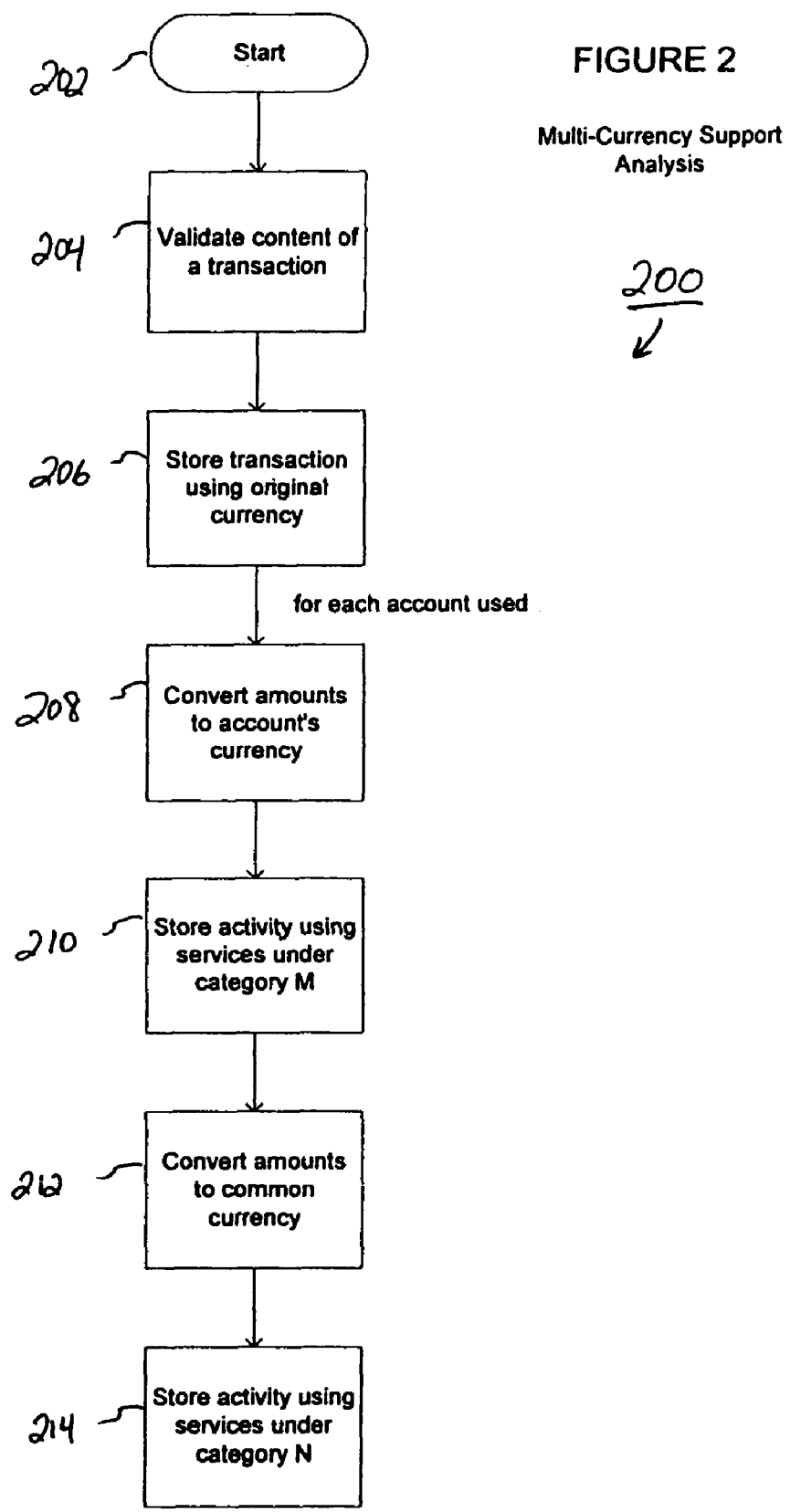

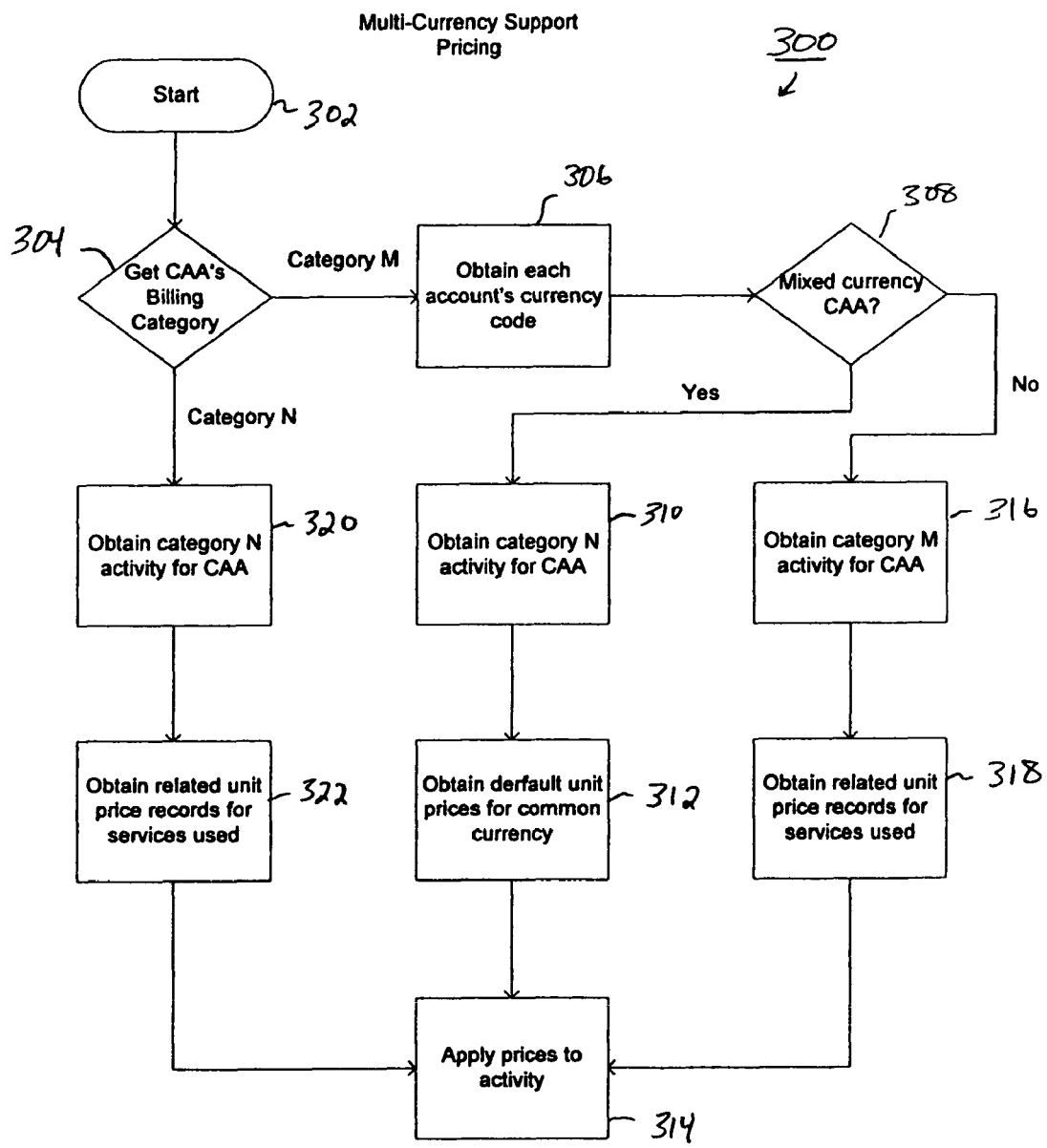

SYSTEM AND METHOD FOR CALCULATING TAXES AND MULTI-CURRENCY PRICING

CROSS-REFERENCE TO CD-ROM APPENDIX

Appendix A submitted herewith on a compact disk contains computer program listings in 646 files in 15 directories, which form a part of the present disclosure. The computer listings, which are hereby incorporated by reference herein in its entirety, contain material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present invention relates generally to pricing, costing, and tax systems, and more particularly to a system and method for calculating taxes and multi-currency pricing.

2. Description of the Related Art

Many tax systems calculate taxes for a financial or commercial transaction based on its components of goods and services. Goods and services may originate or travel through multiple tax jurisdictions that impose different tax treatments and tax obligations on the services or goods. Further, some goods and services may receive different tax treatments based on industry or the nature of the service. For example, foreign goods or services may be treated differently for tax purposes, and other services, such as health care services, may be tax-exempt in a particular jurisdiction.

A value-added tax ("VAT") is an example of a tax that is imposed on goods and services that may receive different treatments based on the origin or the nature of the good or service. In the following detailed description, an exemplary VAT system illustrates a multi-jurisdictional tax system impacting goods and services that are part of a financial transaction. Other examples of a similarly complex tax system include a tax system on telecommunication activities crossing boundaries of multiple tax jurisdictions, a tax system involving multiple states or counties, and a tax system on foreign commerce.

The United Kingdom, Canada, New Zealand, and Australia are among those countries having a VAT system. In those countries, a VAT is applied to most commercial activities involving goods and services (e.g., production, wholesaling and retailing), and is generally assessed on the value added to goods and services at each stage in their production, distribution and sale. For example, a company within a chain of production and distribution is given input VAT credits for the goods it purchases from a supplier ("acquisition credits"). When the company later sells its goods to the next link in the chain, it is charged a VAT on the goods ("tax on supply"). The amount of VAT owed by the company to the government on each item sold is the difference between the tax on supply and the total acquisition credits of all the inputs that can be claimed by the company that are attributable to the item sold.

Some VAT jurisdictions exempt particular kinds of services and goods. For example, some tax jurisdictions exempt from their VAT foreign service inputs in a financial service transaction. The complexity in a VAT system gives rise to many approaches for tracking input tax credits. For example, the "cost allocation approach" tracks all the individual goods and services involved in each transaction. Such an approach, however, imposes a very expensive administrative burden on many companies. Consequently, most VAT jurisdictions allow companies to claim input tax credits using an alternative, simplified method, generally referred to as a "formula approach." Under the formula approach, cost allocation for the purpose of calculating the VAT owed is approximated by a metric, such as a percentage of revenue or a percentage of net income. Government regulations, however, often limit the use of the formula approach to reduced credit acquisitions. As a result, the formula approach is financially unfavorable to the companies engaged in financial transactions because of the potential loss of otherwise available tax credits.

The cost allocation approach provides full and specific attribution of direct and indirect costs to transactions or activities, thus enabling the costs and the VAT paid to more accurately relate back to applicable specific transactions. As discussed above, while the cost allocation method provides a more accurate basis for treating VAT input tax credits than the formula approach, the cost allocation method's complexity incurs high administrative costs. The higher administrative costs are especially burdensome to smaller organizations engaged in transactions with mixed taxed and non-taxed inputs.

A further complication in some VAT calculations (also true of other multi-jurisdictional tax calculations, pricing or billing functions) is that the transactions may occur in more than one currency, or in a foreign currency. Transactions in different currencies complicate VAT calculations and pricing and billing decisions.

SUMMARY OF THE INVENTION

According to one embodiment of the present invention, a method and a system for determining taxes attributable to the components of a financial transaction include: (a) creating a tax rate table, (b) linking an entity to the tax rate table, and (c) determining the tax rate from the tax rate table for at least a component of the financial transaction. As used herein, the entity may be a service, an activity, a financial transaction, an account, a service of an account, a group of accounts, a customer, a legal entity, or any other entity that relates to the transaction, account, or customer holding the account.

In one embodiment, the entity is linked to a tax rate table by global variables or default product rules. A revenue tax, a cost tax, or a transfer tax can all be calculated from tax tables. Further, specific product rules may be created with attributes to link specific entities to specific tax tables, depending on the applicable tax treatments governing the transactions. The method can further calculate the tax owed to a government agency by applying an input tax credit amount against the tax to be collected. "Excluding tax" amounts and profits can also be determined from that calculation.

According to another embodiment of the present invention, a data processing system includes means for creating a tax table, means for creating a link between a financial transaction and the tax table, and means for determining a tax rate or a tax amount for a component of the financial transaction based on the tax table. According to another embodiment of the present invention, a method for multi-currency support analysis for a financial transaction includes: (a) creating a currency exchange rate tables, (b) linking the currency exchange rate table to the financial transaction through a link, an attribute or a product rule, and (c) converting the monetary amounts of the financial transaction from a first currency to a second currency. A company may use, for example, a second currency to be a common currency for managing and pricing its business and services. Alternatively, the second currency may be a currency desired by a customer for a particular account. Such a method may further price a multi-currency Customer Account Analysis ("CAA") group of accounts or a similar group of related accounts by (a) converting the monetary amounts involved in the transactions of the accounts to be expressed in a common or single currency, (b) retrieving the unit price records for the services rendered, and (c) applying the relevant prices to the services.

The present invention is better understood upon consideration of the detailed description below and the accompanying drawings.

BRIEF DESCRIPTION OF THE DRAWINGS

FIG. 1 shows a flow chart of an exemplary method for assigning taxes to transaction services, according to one embodiment of the present invention.

FIG. 2 shows a flow chart of an exemplary method for multi-currency support analysis for a transaction, according to one embodiment of the present invention.

FIG. 3 shows a flow chart of an exemplary method for multi-currency support pricing for a Customer Account Analysis (CAA) grouping of accounts, according to one embodiment of the present invention.

DETAILED DESCRIPTION OF THE PREFERRED EMBODIMENTS

The present invention is illustrated below by examples of data processing systems and methods for determining taxes for financial transactions, such as financial transactions involving multiple currencies. In this detailed description, financial transactions under a VAT system illustrate a tax system involving multiple tax jurisdictions. Typically, each tax jurisdiction imposes its own particular tax treatment on goods and services related to the financial transactions that are rendered within its boundaries. As used in this detailed description, the term "financial transaction" refers generally to any commercial transaction for goods and services, including services and activities related to telecommunication activities, companies, banks, foreign commerce and e-commerce. Of course, the present invention is not limited in its application to the specific examples described below.

In one application of the present invention, described in further detail below, a data processing system and an associate method calculate taxes on financial services and perform multi-currency pricing. In that application, the data processing system uses tax tables and currency exchange rate tables to provide a comprehensive itemized list of all services, listing taxes to be paid to government agencies, taxes to be refunded (or tax credits to be applied), and the net value of these taxes. The data processing system provides a comprehensive and sophisticated system of transaction analysis in which each individual transaction is broken down into component services for costing, pricing, and billing purposes. The component services allow the cost allocation approach to be used for calculating input or acquisition tax credits. The component services can be further broken down, such as taxable activities, input taxed activities and tax-exempt activities, thereby providing an accurate treatment of input tax credits on the cost side, and of VAT charges on the fee, supply or revenue side.

In one VAT system, a financial service tax is determined by a revenue tax amount and a cost tax amount. To determine the respective tax amounts, a comprehensive set of service codes and mapping rules track price and cost VAT amounts for supplies and acquisitions. Different service codes can also be assigned to denote the different tax jurisdictions the goods or the services rendered may fall under. Alternatively, an attribute, a table or a record related to the transaction or an entity related to the transaction can be created to indicate the appropriate tax jurisdiction. To identify the applicable service codes and to apply the mapping rules, the data processing system analyzes the transaction to determine the various components of the transaction. The components are defined at the service or activity level. The revenue or cost tax value for a service or activity is computed by locating an applicable tax table and using the tax table to calculate the appropriate tax rate or tax amount for the service or activity.

A suitable database system for implementing a data processing system of the present invention is described in commonly owned U.S. Pat. No. 6,052,672 entitled "DATA PROCESSING SYSTEM FOR COMPLEX PRICING AND TRANSACTIONAL ANALYSIS," which is hereby incorporated by reference in its entirety. Of course, other suitable database systems can also be used to implement a data processing system according to the methods of the present invention described herein. (Like terms in this detailed description and the '672 patent are intended to be accorded like meanings.)

Using a suitable database system, the services or activities of each transaction are created as entities, which are data objects in the database. One way to implement an entity is to implement it as a record, or an attribute of a record. The nature of each entity (i.e., the type of service or activity each entity represents) is indicated by its product or service code. The product or service codes attach to track-able, price-able, cost-able, collect-able, or statement-able events or actions. Each service code can represent a single atomic event or service within a larger transaction, or a combination of related events or services. Product rules then link the entities to billing categories, billing plans, price or cost tables, tax tables and other data. Alternatively, rather than using product rules, the applicable tax tables for revenue tax calculations, normal cost tax calculations, and transfer (internal) tax calculations can be specified by attributes in default product rules, in global variables or parameters, in entities related to the transaction, in components of the transaction, or in the transaction itself. Particularized product rules are often created to allow special or custom ("exception") pricing. In fact, different product rules may be applied in the financial transactions of different clients, even though the services rendered may be the same. For example, using terms familiar to those skilled in the banking industry, product rules can be created for all products, for all billable service codes (BSC1/2/3/4) of each product, for all billable service codes of each product for each market segment, for all billable service codes of each product for each balance allocation code (BAC), for all billable service codes of each product for each customer account analysis (CAA) group of accounts, and for all billable service codes of each product for an individual.

FIG. 1 is a flow chart of an exemplary method 100 for assigning VAT to transaction services, according to one embodiment of the present invention. Beginning at step 102, the user (e.g., a financial service company or a bank) creates and defines in the data processing system the financial transactions and the mapping rules for the transactions, including production services and billing services. The user also creates and defines various entities in the data processing system, such as billing entities, accounts, pricing relationships.

At step 104, the user initiates the process to compute the VAT associated with revenue from the transaction. At step 106, the company retrieves the account, service, and billing-plan information from the data processing system. To properly determine the VAT associated with the revenue, unit prices, unit costs, total revenue, and total costs are all relevant component inputs to the tax computation. At step 108, the data processing system determines from the billing-plan information whether the particular transaction relates to "services rendered" ("SERV"), or another revenue type "Other". "SERV" cost is the total of all costs associated with billing plan "SERV". "SERV" indicates that the transaction is billed according to "services rendered." Such a transaction is generally treated from the VAT standpoint as having no applicable input tax credit, and the costs are internal costs or allocations of "service rendered costs". For "SERV" type billing plans, "Process for Cost Tax" step 116 is carried out next. However, if the billing plan is of the "Other" category, the VAT associated with the revenue is first determined from the applicable tax table TAXR (step 110). (Tax table TAXR, just as any other tax table, can include either tax rates or a table of tax amounts.) Exemplary billing plans under the "Other" category are fee-based plan "FEE", and a compensation balance plan "COMP" (i.e., based on the value of the balance in the account, for example).

In one embodiment, a product rule refers to a tax table in a "Tax Table name" field. For example, if the "TAX Table name" field contains "TX01", the product rule applies the rates or amounts specified in the tax table labeled "TX01". As used herein, the term "tax table" refers to any data object, such as a record, a table of values, a formula, or an application program through which the applicable tax amounts can be determined. In one embodiment, the tax rates may be stored as multipliers with a method "R" and a schema "RATE" in the data processing system of the present invention. Further, rates can be stored as prices. For example using multipliers:

| Entity Name: | TAXR | |
|---|---|---|
| Product: | PBB | |
| Schema: | RATE | |
| Valid From Date: | 1-Jan-2000 | |
| Minimum: | 1 | |
| 1100030 | Brnch Dep Merch Card Draft | 0.1000 | R |
| 1100040 | Brnch Coin and/or Curr OrdMan | 0.1000 | R |
| 1100041 | Brnch Coin and/or Curr OrdStnd | 0.6947 | R |
| 1100042 | Brnch Coin and/or Curr OrdSpec | 0.1000 | R |
| 1100043 | Brnch Furn CoinLoose | 0.1000 | R |
| 1100044 | Brnch Furn CoinRolled | 0.0700 | R |
| 1100045 | Brnch Furn CoinHalf Box | 0.1000 | R |

At step 112, the data processing system finds the tax rate corresponding to a particular service code of the financial transaction. An "excluding tax" amount can then be computed as the difference between the revenue and the VAT. The service codes and the mapping rules allow the company to breakdown individual supplies and acquisitions for their respective applicable individual VAT treatments. For example, the data processing system of one embodiment uses the rate table named by the parameter-variable AP-REVENUE-TAX-RATES-TABLE to calculate the "excluding tax" amount. At step 114, the data processing system stores the date-effective tax rate in the data processing system alongside the revenue. Of course, the data processing system could store either the date-effective tax rate percentage, or the calculation of the date-effective tax amount. The data processing system then proceeds to "Process for Cost Tax" step 116.

At step 118, to compute the applicable cost tax credits, if the billing plan is in the "Other" category (step 118), cost tax table "TAXC" is associated at step 122. Alternatively, if the billing plan is in the "SERV" category, cost Tax Table "TAXS" is associated at step 120 (i.e., a formula approach can be used with service revenue). In either case, at step 124, the applicable tax credits for the financial transaction are computed from the applicable tax table using the service codes. The date-effective tax rate is stored in the billing record alongside the cost. A second "excluding tax" amount may be calculated, equaling the total cost less the applicable cost tax credits. For example, the data processing system may calculate the second "excluding tax" amount using the tax tables found in the parameter-variables AP-SERV-COST-TAX-RATES-TABLE, when the billing plan is of the "SERV" category, and AP-OTHER-COST-TAX-RATES-TABLE, when the billing plan is in the "Other" category.

The data processing system, in step 128, can then manipulate the stored data in the billing record relating to the revenue, the revenue tax, the costs, and the cost taxes, so that input credits, taxes owed, taxes to be credited are determined. Further, a profit amount can be calculated for each transaction as the difference between the "excluding tax" amounts. Alternatively, the "excluding tax" profit can be computed by applying the revenue tax and the acquisition tax credits to a pre-tax profit. The data processing system can itemize in a statement or a report a list of all services, taxes assessed on the products, and acquisition tax credits to be applied, and the net tax owed to the government, and any other presentation of the data. This data may then be displayed by a user interface (e.g., a computer screen) or reported on an itemized statement generated internally, or generated for a customer or a reporting authority (e.g., an electronic account statement).

In this manner a company can accurately calculate the taxes associated with each service being rendered in the appropriate tax jurisdiction, and the input tax credits and reduced input tax credits that can be applied to each service in each instance. Each component of the customer transaction is thus properly accorded the applicable tax treatment, i.e., whether the components of the transaction is taxable, or tax-exempt in each applicable tax jurisdiction. Costs also are properly treated for tax credits according to whether the costs are internal, out-sourced or imported, and whether that service is eligible for reduced input tax credit. Acquisition activities can likewise be mapped to all supply activities, so that standard unit costs are allocated to the acquisition activities. The input tax credits and reduced input tax credits are calculated based on the tax status of each acquisition activity's related supply activity.

Using service codes and product rules in this manner enables an accurate and comprehensive analysis of each financial transaction, providing maximum flexibility in treating transactions that are taxed in different manners, classes, and rates individually. For instance, a company may classify every financial transaction service by service, and evaluate the cost separately from the revenue.

Alternatively, rather than computing taxes on the component basis, the components of a transaction can be aggregated, and the applicable taxes computed on the aggregated total. In fact, in one embodiment, the tax tables are applied to aggregated transactions of an account, transactions of a group of accounts of the same customer, transactions of a legal entity or transactions occurring within a given tax jurisdiction.

According to another aspect of the present invention, the data processing method and system convert currencies from different transactions into a common currency for each account or customer. The financial institution or its customers can therefore analyze transactions and accounts in one or more common currencies, while at the same time conduct the transactions in the different currencies that are required. Viewed another way, according to the present invention, a company can manage its business as if it uses a single or a small number of "global" currencies, while actually conducting business in a large number of currencies. A company can further price multi-currency financial transactions and CAA accounts in a common currency regardless of the currencies used in the transactions or handled in the accounts.

The multi-currency support analysis can operate in conjunction with the financial service tax support analysis described above to provide a system for global pricing and tax-determination for transactions occurring in various places of the world.

The multi-currency support analysis is applied individually to each financial transaction, which is stored in the data processing system in the currency the transaction was carried out. Like the tax support analysis described above, the data processing system links a transaction or entity to a currency exchange rate table using product rules, mapping rules and service codes. A currency exchange rate table contains rate information for converting one or more currencies to a second or common currency.

FIG. 2 is a flow chart of an exemplary method 200 for a multi-currency support analysis according to one embodiment of the present invention. Beginning at step 202, the data processing system identifies and validates (step 204) each financial transaction that has occurred during a billing cycle to perform a multi-currency analysis. At step 206, the transaction amount is stored in its native currency (i.e., the currency in which the transaction is carried out). For each account involved in the financial transaction, at step 208, the data processing system converts (if necessary) the applicable amount of the transaction in the currency in which the account is kept, and stores, at step 210, the transaction under "category M" (i.e., the account's currency). The conversions are made using exchange rate tables, which are associated using product rules in the manner similar to that discussed above with respect to associating a transaction with applicable tax tables. In one application, the conversion calculations of the currency exchange rate tables adhere to a standard specified for the Euro currency. Under that standard, for example, exchange rates are specified to six significant figures. A conversion between currencies A and B via a common currency C involves dividing the amount in currency A by a first exchange rate to arrive at an equivalent amount under common currency C, and then multiplying the amount in currency C by a second exchange rate to arrive at the equivalent amount under currency B.

Next, at step 212, the transaction is converted from its native currency into a common currency (e.g., U.S. dollars or Euros), and stored at step 214 under "category N" (i.e., in the common currency). Using this common currency, the customer (i.e., the account holder) can view all the accounts in a single "global" currency and at the same time keep each account in its native currency. In one embodiment, the data processing system of the present invention uses an exchange rate table specified in the parameter-variable AP-COMMON-CURRENCY-CODE.

Of course, the data processing system updates the exchange rate tables on an ongoing basis. Update can be achieved by accesses over the Internet, from an update service, or from other data sources. Because exchange rates are constantly varying, transaction amounts, account balances, and pre-priced revenues are time-sensitive. In one example, the exchange rate tables may be updated every 15 to 60 minutes, depending on the accuracy desired. The new exchange rates are stored with a Min-Tran threshold tag that keeps track of the elapsed time since the last update on any particular day.

In some embodiments the exchange rates can be stored as multipliers with a method "R" and schema "RATE". For example, a Rate Table to convert the Euro to various currency equivalents can be provided as follows:

| | Entity Name: | EUR | |
|---|---|---|---|
| | Product: | CURX | |
| | Schema: | RATE | |
| | Valid From Date: | 13-Jan-2000 | |
| | Minimum: | 1315 | |
| ATS | AustriaSchilling | 12.0919 | R |
| AUD | AustraliaDollar | 1.5753 | R |
| BEF | BelgiumFrancs | 42.0168 | R |
| BRL | BrazilReal | 1.66611 | R |
| CAD | CanadaDollar | 1.39938 | R |
| GBP | UKPound | .689275 | R |
| USD | USDollar | .951475 | R |

Using the exchange rate table above, for example, 43.15 British Pounds is converted to its Euro equivalent by the data processing system first locating the currency exchange rate table EURO above for product CURX, which is tagged with a valid-from-date and time (min-tran-count) tag that is the closest and hence, most appropriate, to the date and time required (e.g., the timestamp that equals or immediately precedes the effective accounting timestamp of the transaction). From this exchange rate table, the data processing system looks up the British Pound "GBP" (i.e., the Euro-to-GBP-rate). 43.15 GBP is then simply divided by the Euro-to-GBP-rate, giving 43.15/0.689275=62.60 Euros to two decimal places.

To convert between two currencies that are not one of the selected common currencies, a two-step process can be used. In the first step, the transaction amount in the first currency is converted into the common currency, and then, in the second step, the amount in the common currency is converted into the second currency. For example, if it is desired to convert 2,500.00 Canadian Dollars to Brazilian Reals, the data processing system uses the procedure described above to convert the 2,500 Canadian dollars into 1,786.505452 Euros. (Here, the Euro equivalent is rounded to six decimal places for added precision even though, under the Euro standard, only four decimal places are required for interim results.) The system then looks up the BRL service within this set of EUR exchange rates (i.e., the Euro-to-BRL-rate), to obtain 1,786.505452×1.666110=2,976.51 BRL (rounded to two decimal places).

FIG. 3 shows a flow chart of an exemplary method 300 for multi-currency support pricing of a transaction, according to one embodiment of the present invention. As shown in FIG. 3, method 300 is applied from a CAA main account. A CAA is a group of related accounts consisting of a main account linked to one or more subordinate accounts. At step 304, the data processing system determines the CAA's "billing category", which is either category N (common currency) or M (the selected currency for the account). In one application, where a CAA contains mixed currencies (e.g., account 1 is GBP, account 2 is USD, account 3 is USD, and account 4 is EUR), billing category N (common currency) is used to ensure a consistent currency is applied to the entire CAA.

When the CAA's billing category is category N, the data processing system obtains category N activity (or services) for the CAA in step 320. At step 322, the related unit price records for the services rendered are obtained, and in step 314, prices are applied to the activity. Thus, a CAA with a common currency is priced using the common currency.

Alternatively, when the CAA's billing category is category M, the data processing system obtains each account's currency code within the CAA in step 306. In one embodiment the account currency code is stored as an attribute on the account record. The data processing system then determines if the CAA is a mixed currency CAA in step 308.

When the CAA is a mixed currency CAA, the data processing system obtains category N activity for the CAA in step 310. To price a mixed currency CAA, pricing is established using the common currency. Thus, the monetary amounts of the CAA (e.g., account balances, transaction amounts, pre-priced revenue amounts) are converted to the common currency (i.e., category N). Step 310, like step 320, obtains category N activity for the CAA. At step 312, the data processing system obtains default unit price and cost tables for the common currency, and then applies the appropriate prices to the activity at step 314.

When the CAA is not a mixed currency CAA, at step 316, the data processing system obtains category M activity for the CAA. At step 318, the data processing system obtains related unit price records for the services rendered and then applies, at step 314, the related unit prices thus obtained to the activity.

In some embodiments, although the pricing and costing functions are performed at the CAA level, total revenue and cost for each service used can be apportioned back to an individual account or transaction, if desired. For example, one may determine the profitability of a transaction by executing the pricing and costing against the CAA(s) of the debit and credit accounts, and then apportion the pricing and costing thus obtained back to the individual accounts according to an appropriate rule.

Therefore, the present invention provides a method and a system for conducting a financial transaction in any currency while, using the multi-jurisdictional tax support and multi-currency pricing analysis described above, allowing both pricing and taxes related to the transaction to be computed for any desired currency. For example, a company located in the United States, operating on US Dollars basis, can determine the pricing and the applicable taxes for a subsidiary Canadian corporation, operating on the basis of Canadian dollars, for a financial transaction that took place in Belgium Francs. The subsidiary Canadian corporation can view the entire transaction, prices, and tax calculations in Canadian Dollars, while the US parent can view the same transaction in U.S. Dollars.

The above detailed description illustrates specific embodiments of the present invention and is not intended to be limiting. Numerous modifications and variations within the scope of the present invention are possible. For example, numerous combinations of the tax rate support method and system can be combined in various ways with the multi-currency support analysis and pricing method and system. Accordingly, the present invention is defined by the appended claims.

I claim:

1. In a data processing system including a database, a method of multi-currency support analysis for a transaction, comprising:
   creating in the database of the data processing system an entity representing a currency exchange rate table that converts between a value expressed in a first currency and an equivalent value expressed in a second currency;
   representing each service or product in the database by an entity which is being referred to as a service code or a product rule;
   creating an attribute in the product rule or the service code to link the product rule or the service code to the currency exchange rate table;
   identifying components of the transaction, each component being one or more services or products valued at the first currency;
   representing each component of the transaction as an entity in a database; and
   converting the values of the service or the product in one or more components expressed in the first currency into amounts expressed in the second currency based on the currency exchange rate table.

2. The method of claim 1, wherein the converting is performed after aggregating components of a transaction.

3. The method of claim 1, wherein the converting is performed after aggregating transactions.

4. The method of claim 1, wherein the currency exchange rate table includes a currency exchange rate represented by a multiplier.

5. The method of claim 1, wherein the linking uses at least one default product rule to link the currency exchange rate table.

6. The method of claim 1, wherein the currency exchange rate table is periodically updated.

7. The method of claim 1, further comprising pricing accounts with transactions in multiple currencies using a predetermined currency.

8. The method of claim 7, further comprising retrieving unit price records for a service rendered and applying prices on the unit price records to the service.

9. The method of claim 8, further comprising displaying results of applying prices on the unit price records in a user interface.

10. The method of claim 8, further comprising listing results of applying prices on the unit price records in a statement.

11. The method of claim 1, further comprising:
   creating a tax table;
   linking the tax table to an entity of the transaction; and
   calculating a tax based on the tax table.

12. A non-transitory computable readable medium for use in a data processing system for multicurrency support analysis for a transaction, comprising instructions executable by a processor in the data processing system for:
   creating in a database an entity representing a currency exchange rate table that converts between a value expressed in a first currency and an equivalent value expressed in a second currency;
   representing each service or product in the database by an entity which is being referred to as a service code or a product rule;
   creating in the service code or the product rule an attribute that links the service code or the product rule to the currency exchange rate table;
   identifying components of the transaction, each component being one or more services or products valued at the first currency;
   representing each component of the transaction as an entity in a database; and
   converting the values of one or more values of the service or the product in one or more components expressed in the first currency into amounts expressed in the second currency based on the currency exchange rate table.

13. The computer-readable medium of claim 12, wherein the attribute is a global variable.

14. The computer-readable medium of claim 12, wherein the converting applies a conversion on a component of a transaction.

15. The computer-readable medium of claim 12, wherein the converting applies a conversion after aggregating components of a transaction.

16. The computer-readable medium of claim 12, wherein the converting applies a conversion after aggregating transactions.

17. The computer-readable medium of claim 12, wherein the currency exchange rate table includes a currency exchange rate represented by a multiplier.

18. The computer-readable medium of claim 12, wherein the creating an attribute uses a default product rule to link the currency exchange rate table.

19. The computer-readable medium of claim 12, wherein the currency exchange rate table is periodically updated.

20. The computer-readable medium of claim 12, further comprising instructions executable by the processor for pricing accounts with transactions in multiple currencies using a predetermined currency.

21. The computer-readable medium of claim 20, further comprising instructions executable by the processor for retrieving unit price records for a service rendered and means for applying prices on the unit price records to the service.

22. The computer-readable medium of claim 21, further comprising instructions executable by the processor for displaying results of applying prices on the unit price records in a user interface.

23. The computer-readable medium of claim 21, further comprising instructions executable by the processor for listing results of applying prices on the unit price records in a statement.

24. The computer-readable medium of claim 12, further comprising instructions executable by the processor for:
creating a tax table;
linking the tax table to an entity of the transaction; and
calculating a tax based on the tax table.

25. The method of claim 1, wherein the attribute is a global variable.

* * * * *